United States Patent
Hattori et al.

[11] Patent Number: 5,296,084
[45] Date of Patent: * Mar. 22, 1994

[54] TAPE ALIGNMENT MECHANISM

[75] Inventors: Shigenori Hattori, Ama; Atsuhiro Kobayashi, Nagoya, both of Japan

[73] Assignee: Brother Kogyo Kabushiki Kaisha, Aichi, Japan

[*] Notice: The portion of the term of this patent subsequent to Apr. 20, 2010 has been disclaimed.

[21] Appl. No.: 22,765

[22] Filed: Feb. 25, 1993

Related U.S. Application Data

[63] Continuation of Ser. No. 422,113, Oct. 16, 1989, abandoned.

[30] Foreign Application Priority Data

Oct. 19, 1988 [JP] Japan ............................. 63-136362[U]

[51] Int. Cl.$^5$ ............................................. B32B 31/00
[52] U.S. Cl. .................................. 156/554; 156/385; 156/386; 156/555; 226/181; 400/208; 400/613
[58] Field of Search ........ 156/554, 555, 324, 384–387; 400/208, 613; 226/181, 189

[56] References Cited

U.S. PATENT DOCUMENTS

| | | | |
|---|---|---|---|
| 3,193,433 | 7/1965 | Tillotson | 156/554 X |
| 3,219,246 | 11/1965 | Kihara | 226/181 |
| 3,462,057 | 8/1969 | Yamamoto | 226/181 |
| 3,941,646 | 3/1976 | Petry et al. | 156/554 X |
| 4,226,547 | 10/1980 | Bradshaw et al. | |
| 4,286,860 | 9/1981 | Gursky et al. | 226/181 |
| 4,402,619 | 9/1983 | Paque et al. | 400/208 |
| 4,419,175 | 12/1983 | Bradshaw et al. | |
| 4,557,617 | 12/1985 | Richardson et al. | 400/208 |

FOREIGN PATENT DOCUMENTS

| | | |
|---|---|---|
| 0244631 | 3/1987 | European Pat. Off. |
| 0272232 | 11/1987 | European Pat. Off. |
| 0322918 | 12/1988 | European Pat. Off. |
| 1264947 | 5/1970 | United Kingdom |
| 1399566 | 4/1973 | United Kingdom |
| 1459149 | 7/1974 | United Kingdom |
| 1470903 | 3/1975 | United Kingdom |

*Primary Examiner*—David A. Simmons
*Assistant Examiner*—James J. Engel, Jr.
*Attorney, Agent, or Firm*—Kane, Dalsimer, Sullivan, Kurucz, Levy, Eisele and Richard

[57] ABSTRACT

In a tape alignment mechanism for overlapping two or more tapes with an alignment operation in a width direction, the tape alignment mechanism comprises an alignment member.

For example, when a tape is fed through a roller member having a pair of flange portion of which interval of length is designed to be substantially similar to a width of the tape, the tape is aligned in a width direction.

Further, an another tape to be overlapped with the tape is fed through the roller member, and thus, the two tapes are acculately overlapped.

9 Claims, 3 Drawing Sheets

TAPE ALIGNMENT MECHANISM

This application is a continuation of application Ser. No. 07/422,113, filed Oct. 16, 1989, now abandoned.

BACKGROUND OF THE INVENTION

The present invention relates to a tape alignment mechanism for pressure-bonding two tapes fed through two independent paths with an alignment operation in a width direction, more particularly, to a tape alignment mechanism employed in a tape cassette including at least a film tape and an adhesive tape for feeding out the two tapes in an overlapped state.

In general, the mechanism of this character comprises, in the feed path of the tapes, a support member carrying both tapes and a pair of restricting elements restricting widthwise movement of the tapes to bring the tapes into alignment. The aligned tapes are pressed together by applying an external pressure to the pressure member such as a pressure roller.

When pressure-bonding the film tape and adhesive tape after alignment, it is desirable to make the width of the two tapes equal and also make the distance between the restricting elements equal to the tape width so as to improve the aligning accuracy. However, it is quite difficult to completely align the tapes because they are sent to the alignment unit along two independent paths. If there is any misalignment in the tapes in such circumstances, the actual value of width of the bonded tapes may be greater than the distance between the restricting elements. The tapes may then ride over the restricting elements to fall beyond them.

If the width of the both tapes are made smaller than the distance between the restricting elements, while the tapes will be certainly protected from falling out of the restricting elements, the adhesive surface of the adhesive tape is likely to be exposed to the film tape surface.

SUMMARY OF THE INVENTION

It is therefore an object of the invention to provide an improved tape alignment mechanism capable of bringing the tapes into proper alignment for pressing them together, without allowing the tapes to drop out of the restricting elements or without any exposure of the adhesive surface of the adhesive tape when aligning and bonding the film tape and the adhesive tape.

For this purpose, according to this invention, there is provided a tape alignment mechanism employed in a tape feed mechanism for feeding two tapes in an overlapped states, each of the two tapes respectively being arranged to be attachably and detachably mounted on the tape feed mechanism, the tape alignment mechanism comprises: a first feed member for feeding one of the two tapes; and a second feed member for feeding the other of the two tapes in accordance with an operation of the first feed member including an adjust member for adjusting a position of the overlapped two tapes in a width direction.

DESCRIPTION OF THE ACCOMPANYING DRAWINGS

FIG. 1 is a disassembled perspective view of the tape storage casette embodying the present invention, FIG. 2 is an explanatory view showing the tape storage casette of FIG. 1 attached to the printer unit, and FIG. 3 is an illustrative diagram indicating dimensions of the film tape, double-adhesive tape, alignment roller and feed roller.

DESCRIPTION OF THE EMBODIMENT

The tape storage cassette incorporating the present invention is now described below with reference to the accompanying drawings.

Figure 1:
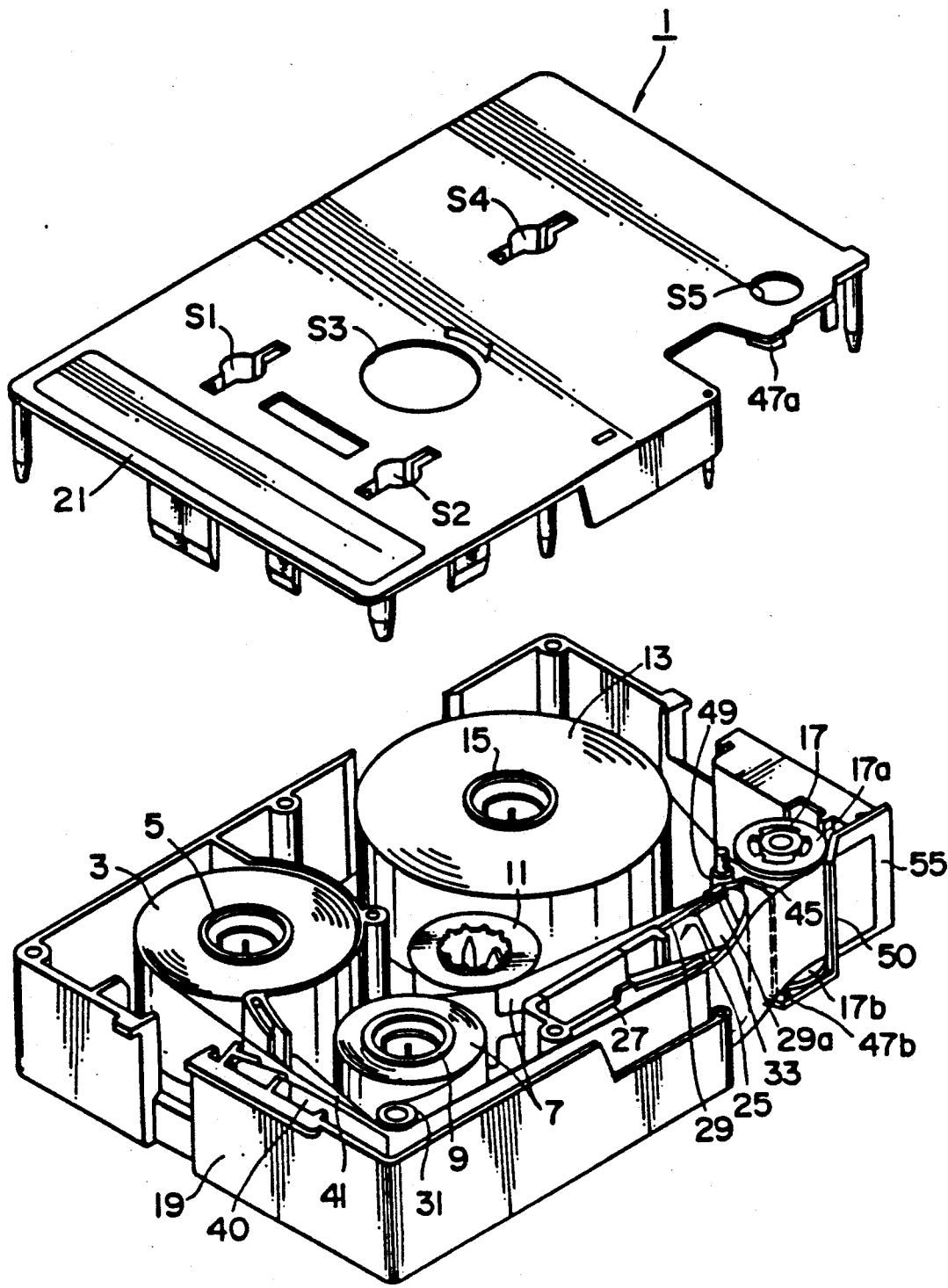

As shown in the disassembled perspective view of FIG. 1, the tape storage cassette 1 according to this embodiment includes a film tape spool 5 around which a transparent film tape 3 is fitted, a ribbon feed spool 9 having a thermal transfer ribbon 7 wound thereon with its inked surface facing inside, a ribbon takeup spool 11 taking up the thermal transfer ribbon 7 drawn out of the ribbon feed spool 9, a double-sided adhesive tape spool 15 on which a double-sided adhesive tape 13 narrower than the film tape 3 and having one surface covered with an exfoliative sheet is wound with this sheet covered surface facing outside, and an alignment roller 17 for alignment of the double-sided adhesive tape 13 and the film tape 3, all of which are stored in a cassette case 19. They are rotatably carried by support members S1 through S5 mounted on a cover 21 and on the bottom of the cassette case 19 opposed to the cover 21 within the cassette case 19 whose opening is covered with the cover 21.

The tape storage cassette 1 is attachably and detachably mounted on a printer unit capable of reverse-printing desired characters. Thus, the unit accomplishes reverse-printing on the film tape 3 using the thermal transfer ribbon 7. The double-sided adhesive tape 13 is then stuck to the printed surface to provide a print tape with desired characters already printed.

Figure 2:
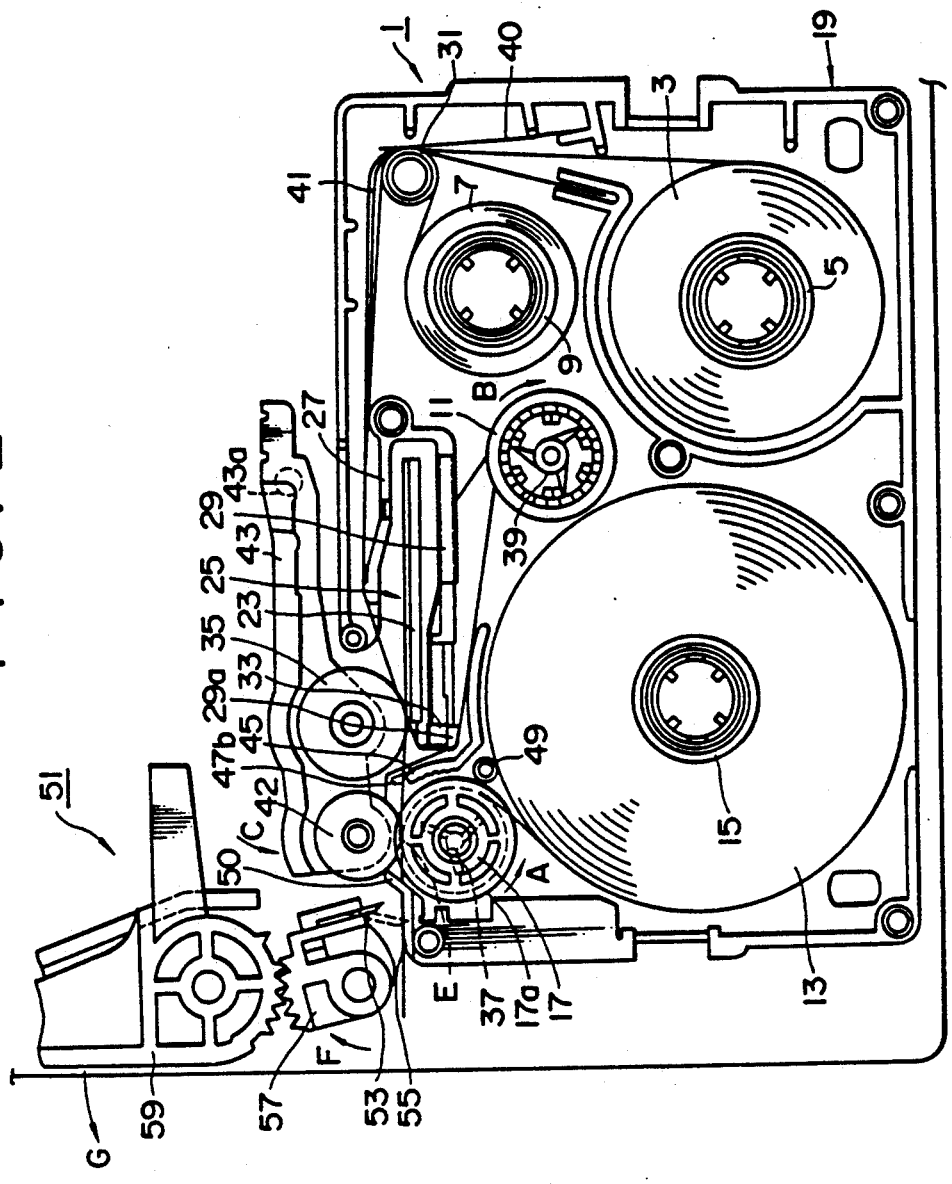

The tape storage cassette 1 is formed with a recess 25 to receive a thermal head 23 mounted on the printer unit as shown in FIG. 2. Along the inner and outer periphery of the recess 25 provided are upright extending guide plates 27 and 29 to define a space for receiving the thermal head 23. FIG. 2 represents the tape storage cassette 1 fitted in the printer unit, so that the following description will be made with reference mainly to this drawing.

The film tape 3 and the thermal transfer ribbon 7 with its inside surface coated with ink face across each other and are guided together to the recess 25 by means of a guide pin 31. Guide plates 27 and 29 form a restricting path for the film tape 3 and the thermal transfer ribbon 7 sent to the recess 25 to avoid their blocking the space accommodating the thermal head 23. The guide plate 29 extending upright from the inner periphery of the recess 25 is provided with a leaf spring 33 loading the film tape 3 and the thermal transfer ribbon 7 outward to thereby ensure a required space for receiving the thermal head 23.

When the tape storage cassette 1 is attached to the printer unit, the thermal head 23 is thus located behind the thermal transfer ribbon 7. The film tape 3 and the thermal transfer ribbon 7 are then pressed against the thermal head 23 by means of a platen roller 35 provided on the printer unit and movable into and out of engagement with the thermal head 23, whereby desired reverse characters can be printed on the film tape 3.

The thermal transfer ribbon 7 passed through the recess 25 is taken up onto the ribbon takeup spool 11 via an end 29a of the guide plate 29. At the same time, the film tape 3 is drawn out of the cassette 1 by means of alignment roller 17. When attached to the printer unit, the alignment roller 17 and the ribbon takeup spool 11 are respectively splined to a tape feed element 37 and a ribbon takeup element 39 on the printer unit which are driven for rotation in opposite directions by a drive motor and power transmission mechanism, not shown, and are rotatably driven by these elements in the directions indicated by arrows A and B.

The thermal transfer ribbon 7 and the film tape 3 thus travel along the path consisting of guide pin 31, guide plate 27 and recess 25 by such rotary drive motion. Inertia of such rotary motion however causes an extra amount of thermal transfer ribbon 7 and film tape 3 to be drawn from the respective spools 5 and 7. This results in slack of the ribbon 7 and the tape 3 in the recess 25, making it impossible to accomplish a proper reverse-printing action on the film tape 3. To overcome this problem, the present tape storage cassette 1 is provided with a leaf spring 40 mounted near the guide pin 31, which pressingly biases the thermal transfer ribbon 7 and the film tape 3 from outside. The thermal transfer ribbon 7 and the film tape 3 are thus loaded with back tension to prevent the thermal transfer ribbon and the film tape 3 from being slackened at the recess 25. Furthermore, there is provided a separator film 41 which protects the film tape 3 from ink coating on the thermal transfer ribbon 7 during traveling along the feed path between the position at which the film tape 3 is drawn from the film tape spool 5 and the recess 25. The film tape 3 and the thermal transfer ribbon 7 are given back tension independently of each other by means of the separator film 41 and the leaf spring 40 so that, even if one of the film tape 3 and the thermal transfer ribbon 7 is drawn out for some reason, such pulling action would not affect normal feed motion of the remaining one of the tapes.

The alignment roller 17 not only brings the film tape 3 and the double-sided adhesive tape 13 into alignment but also is operatively associated with a feed roller 42 on the printer unit movable into and out of engagement with the alignment roller 17 to press the adhesive surface of the double-sided adhesive tape 13 against the print surface of the film tape 3 so as to bond the both tapes together. As shown in FIG. 1, the alignment roller 17 is at its both ends provided with flanges 17a and 17b mounted at right angles to the roller surface so as to restrict widthwise movement of the both tapes 3 and 13. The feed roller 42 is carried by a support member 43 mounted on the printer unit for rotation about an axis 43a. With the tape storage cassette 1 attached to the printer unit, the support member 43 is biased in the direction indicated by an arrow C by means of biasing means not shown, so that the film tape 3 and the double-sided adhesive tape 13 are pressed against the roller surface of the alignment roller 17 for bonding the tapes together.

Figure 3:
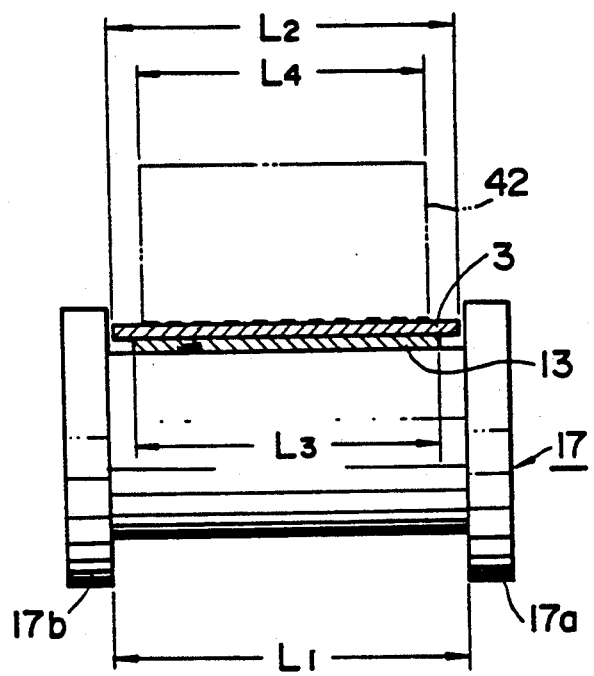

Namely, the alignment roller 17 and the feed roller 42 form together the tape alignment mechanism according to the present invention. As shown in FIG. 3, the distance L1 between the flanges 17a and 17b of the alignment roller 17 is made equal to the width L2 of the film tape 3 (in practice, the distance L1 is made a little greater than the tape width L2 to compensate for some difference in tape width L2 because of dimensional error). The film tape 3 and the double-sided adhesive tape 13 narrower than tape 3 (with a tape width of L3) are thus brought into alignment on the roller surface of the alignment roller 17 by means of the flanges 17a and 17b. The tapes thus aligned are then pressed together in association with the feed roller 42 pressing the roller surface.

The feed roller 42 is made of a resilient material such as silicon rubber to protect film tape 3 from scratches during pressing and to provide a required resistance and friction force. Its width L4 is set to a somewhat smaller value than that of the double-sided adhesive tape in consideration of possible widthwise stretching due to resilient deformation. In other words, the value of the L4 is designated to be substantially similar to the value L3 in case that the feed roller 42 pressurize the film tape 3. Also, when the tape storage cassette 1 is kept attached to the printer unit for a long time, allowing the feed roller 42 to keep the both tapes pressed against the alignment roller 17, the film tape 3 is likely to be stuck to the feed roller 42. To avoid this problem of sticking, the surface of the feed roller 42 is roughened by filing treatment to provide a required friction force.

The support member 43 carrying the feed roller 42 on the printer unit also carries the platen roller 35 thereon, so that the platen roller 35, like feed roller 42, biases the support member 43 in the direction indicated by the arrow C to press the film tape 3 and the thermal transfer ribbon 13 against the thermal head 23. The platen roller 35 is like the feed roller 42 also in that it is formed by a resilient material such as rubber to avoid scratches at film tape 3 during pressing and to provide a required resistance and friction force.

In the feed path of film tape 3 from the recess 25 to the alignment roller 17 provided is a guide plate 45 for guiding the film tape 3 to a joint position E with the double-sided adhesive tape 13 on the alignment roller 17. The guide plate 45 is at both ends, i.e., at the cover 21 and the cassette case 19 shown in FIG. 1, provided with restricting elements 47a and 47b for restriction of widthwise displacement of the film tape 3. Since a length of the tarvel path of the film tape 3 is longer than that of the double-sided adhesive tape 13, it is considered that the film tape 3 is aligned in a width direction in advance before it is overlapped with the double-sided adhesive tape 13 by means of the feed roller 42 and the alignment roller 17.

The film tape 3 is thus kept away from widthwise movement also by these restricting elements 47a and 47b, so that widthwise displacement of the film tape 3 is further securely prevented by the flanges 17a and 17b on the alignment roller 17.

The feed path of the double-sided adhesive tape 13 to the alignment roller 17 includes a guide roller 49 made of silicon resin to prevent the double-sided adhesive tape 13 from sticking to other parts such as thermal transfer ribbon 7 in the cassette 1. The double-sided adhesive tape 13 passed through this path is then guided to the joint position E with the film tape 3 by the roller surface of the alignment roller 17.

The film tape 3 and the double-sided adhesive tape 13 thus joined together by the alignment roller 17 and the feed roller 42 (i.e., print tape) are guided out of the cassette 1 by way of a tape holder 50 provided at the exit. The tape travel path outside the cassette case 19 is provided with a block 55 for receiving a cutting blade 53 in the tape cutter 51 mounted on the printer unit. The print tape thus completed is then cut off by pressing the cutting blade 53 against the block 55 in operation of the tape cutter 51. The tape cutter 51 is rotatably mounted on the printer unit and consists of a cutting blade holder 57 carrying the cutting blade 53 and a rotary arm 59 for rotating the cutting blade holder 57 in the direction indicated by an arrow F. The print tape is cut off by manually moving the rotary arm 59 in the direction indicated by an arrow G.

As fully described above, according to this embodiment, the film tape 3 and the double-sided adhesive tape 13 narrower than the film tape 3 are brought into alignment on the roller surface of the alignment roller 17 by means of a pair of vertically extending flanges 17a and 17b spaced at a distance substantially equal to the width of the film tape 3. The tapes aligned are pressed against the roller surface of the alignment roller by means of the feed roller 42 for bonding together. As a result, on the roller surface of the alignment roller 17, winding displacement of the double-sided adhesive tape 13 is tolerated within the range of difference between its width L3 and the distance L1 between the flanges 17a and 17b, but the film tape 3 is entirely restricted against displacement. Thus, even if the tapes are displaced in the path up to the alignment roller 17, the double-sided adhesive tape 13 can be properly bonded to the print surface of the film tape 3 as its winding displacement is satisfactorily restricted. This can successfully protect the tapes from falling out of the flanges 17a and 17b and and the adhesive surface of the double-sided adhesive tape 13 from being exposed to the film tape 3.

Since in this embodiment there are provided restricting elements 47a and 47b in the feed path of film tape 3 to the alignment roller for restricting widthwise movement thereof, widthwise displacement of the film tape can be reliably prevented for more accurate alignment of the both tapes 3 and 13.

While in the foregoing embodiment, the alignment element is provided by the alignment roller with flanges at its both ends and the pressure element by the feed roller pressing against the roller surface of the alignment roller, they need not necessarily be roller elements but may be provided by a flat plate mounted in the tape travel path, which has a flange extending along the travel path so that an external force is applied to the tape carrying surface of the flat plate, as an applicable example of the present invention.

What is claimed is:

1. A tape storage device comprising:
   a tape feed mechanism;
   a film tape detachably mounted on said tape feed mechanism;
   a double sided adhesive tape detachably mounted on said tape feed mechanism;
   an exfoliative sheet disposed over one side of said double sided adhesive tape;
   said tape feed mechanism comprising:
      a first feed member comprising a first feed roller for feeding one of said tapes;
      a second feed member comprising a second feed roller adapted to be brought into and out of engagement with said first feed roller for feeding the other of said tapes to a position overlapping said one tape in accordance with an operation of said first feed member; and,
      an adjust member comprising a pair of flange portions on said second feed roller for adjusting the position of the overlapped tapes in a width direction thereof, wherein the spacing between said flange portions is substantially the same as the width of said film tape, the width of said first feed roller is less than the spacing between said pair of flange portions, less than the width of said film tape and substantially the same as the width of said double sided adhesive tape whereby said first feed roller may be brought into engagement with said second feed roller.

2. The tape storage device according to claim 1 wherein said first feed roller comprises a roller made of an elastic material and having a circumferential surface with a predetermined adhesive force with a surface of the one of said two tapes whereby to prevent adhesion to said one tape in case that said first feed roller is contacted with said one tape.

3. The tape storage according to claim 1 wherein the width of said first feed roller is further arranged to be less than a width of double-sided adhesive tape with the exfoliative sheet.

4. The tape storage device according to claim 1 which further comprises a regulation member, provided in a feeding path of the one of said two tapes upstream of where said one tape is overlapped with the other of said two tapes, for regulating a position of the one of said two tapes in a direction perpendicular to a direction along which the one of said two tapes is fed.

5. The tape storage device according to claim 4 wherein said regulation member comprises a pair of projection members spaced apart a distance substantially similar to the width of the one of said two tapes.

6. A tape printing device comprising:
   a film tape adapted to receive on one surface thereof printing;
   a double-sided adhesive tape with an exfoliative sheet;
   a tape feed device; and,
   a printer for printing on said film tape surface;
   a tape feed mechanism comprising:
      a tape holding case including said film tape and said double-sided adhesive tape, said tape holding case being attachably and detachably mounted on said tape feed device;
      a first feed roll member for feeding said film tape and said film and adhesive tapes when said tapes are in an overlapping condition, said first feed roller having a circumferential surface which reacts with said adhesive tape with a predetermined adhesive force whereby to prevent adhesion of said circumferential surface to said adhesive tape in the event that said first feed roller is contracted with said adhesive tape;
      an adjust member comprising a second feed roller member adapted to be brought into and out of engagement with said first feed roller member to thereby cooperate with said first feed roller member in feeding said tapes when they are in an overlapped condition and a pair of flange portions provided on said second feed roller member; wherein the width of said first feed roller is less than the width of said film tape, less than the spacing between said flanges and substantially equal to the width of said adhesive tape.

7. The tape printing device according to claim 6 which further comprises a pair of projection members spaced apart a distance substantially similar to the width of the one of said two tapes, the one of said two tapes being fed between said projection members before it is overlapped with the other of said two tapes.

8. The tape printing device according to claim 6 wherein said print member comprises a thermal head member.

9. The tape storage device according to claim 6 wherein the width of said feed roller member is further arranged to be less than a width of said double-sided adhesive tape with the exfoliative sheet.

* * * * *